UNITED STATES PATENT OFFICE.

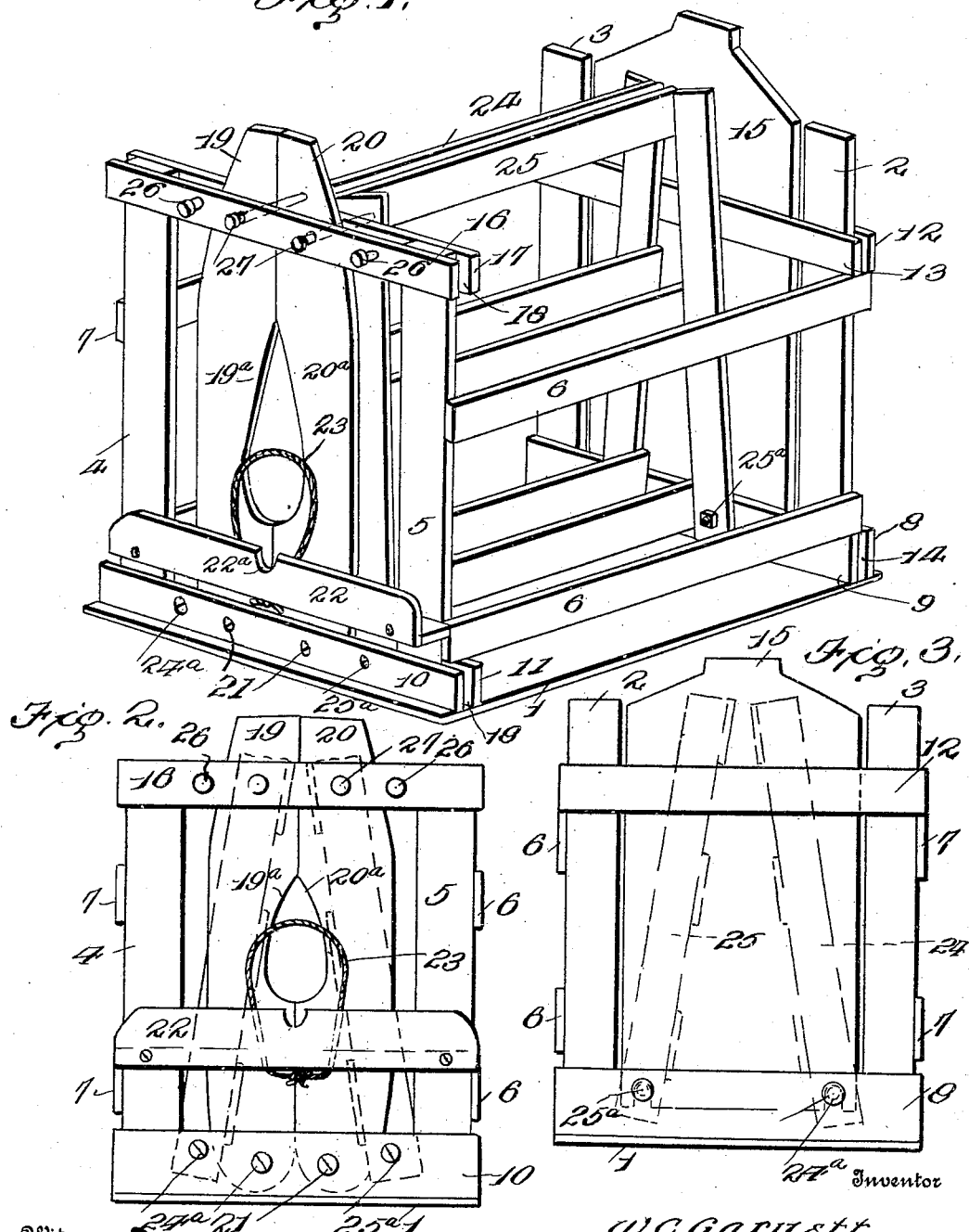

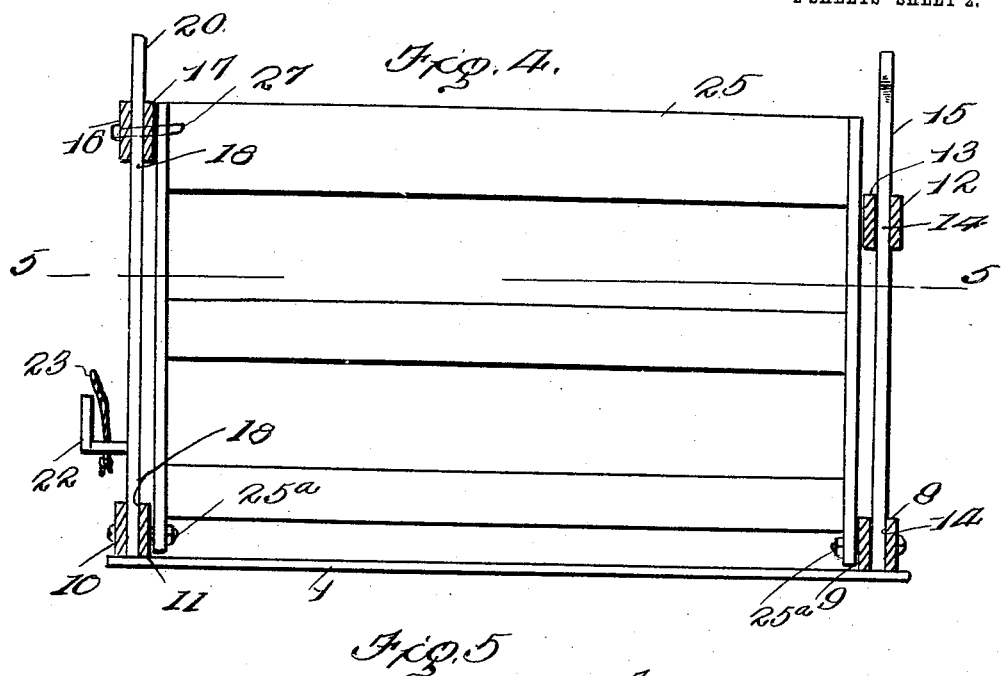
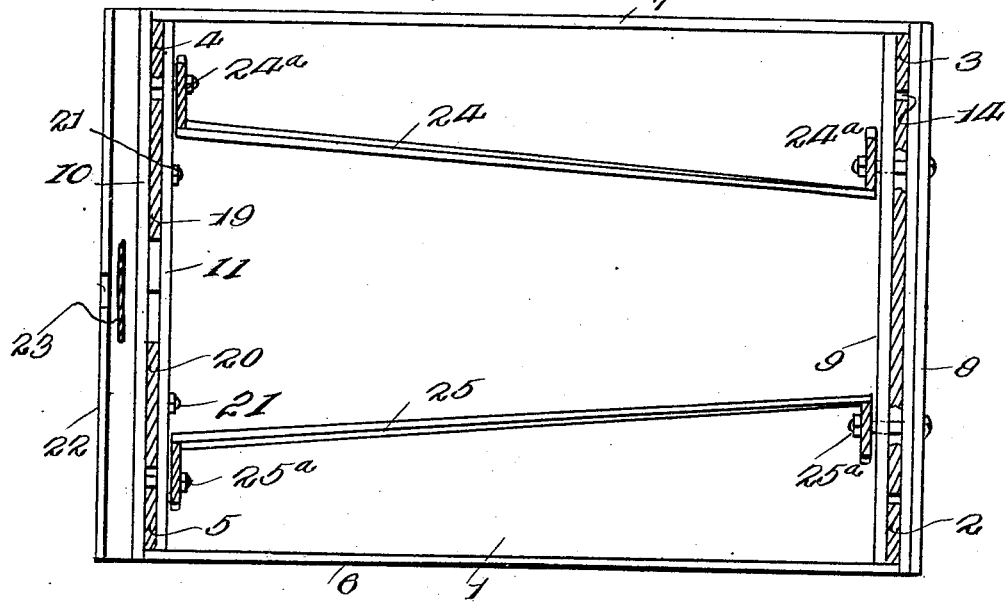

WILLIAM C. GARNETT, OF TIFFIN, IOWA.

HOG-STANCHION.

932,384. Specification of Letters Patent. Patented Aug. 24, 1909.

Application filed July 8, 1908. Serial No. 442,488.

*To all whom it may concern:*

Be it known that I, WILLIAM C. GARNETT, citizen of the United States, residing at Tiffin, in the county of Johnson and State of Iowa, have invented certain new and useful Improvements in Hog-Stanchions, of which the following is a specification.

This invention comprehends the construction of an animal stanchion particularly adapted for holding hogs in a convenient position for operation.

In the management of hogs it is often necessary to perform operations on the nose, head or other part of the animal, and it is very necessary that the hog should be held under restraint during the operation. It has heretofore been the custom to apply rings to the noses of hogs for preventing them from rooting, but it has been discovered by me that the inhuman practice of placing rings on hogs' noses could be abolished by severing the cords which control the movement of the nose. The practice of ringing hogs is therefore being substituted by the more scientific practice of severing the nose moving cords.

The development of the above art has produced a demand for a stanchion that will enable a hog breeder or other person skilled in the art, to quickly and accurately perform the operation of cord severing, and one of the objects of this invention is to produce such a stanchion.

Another object of this invention is the construction of an animal stanchion capable of accommodating various sizes of animals and provided with nose or head engaging members.

With these and other objects in view, this invention comprises certain novel constructions, combinations and arrangements of parts illustrated in the accompanying drawings and particularly described in the specification and claims.

For a full understanding of the invention, reference is to be had to the following description and accompanying drawings, in which:

Figure 1 is a perspective view of my improved stanchion, Fig. 2 is an end elevation showing the neck engaging members, Fig. 3 is an end elevation showing the gate entrance, Fig. 4 is a side elevation, and Fig. 5 is a sectional view on the line 5—5 of Fig. 4.

Corresponding and like parts are referred to in the following description and indicated in all the views of the drawings by the same reference characters.

My improved animal stanchion may be made in different sizes and shapes, and be adapted for use with all kinds of animals on ranches or for shipment, and is particularly useful in transporting calves, sheep, or hogs, and especially breeding animals, without injury.

In the drawings, an animal stanchion arranged to receive a hog for operating purposes is illustrated. This stanchion comprises a pen or outer framework formed with a floor 1, upright parts 2, 3, 4 and 5, horizontal parts 6 and 7 constituting side pieces, base parts 8 and 9, and 10 and 11 which are connected with opposite sides of the upright parts. The uprights 2 and 3 are provided with a plurality of horizontal members 12 and 13, which are secured to opposite sides of the uprights 2 and 3 and coöperate with the base members 8 and 9 to form guideways 14 for a removable gate 15. The upright parts 4 and 5 have connected thereto horizontal strips 16 and 17 that, together with the base parts 10 and 11, form guideways 18 in which laterally swinging clamping members 19 and 20 are pivotally mounted by means of bolts 21 or the like passing through the base parts 10 and 11, as shown. These clamping members 19 and 20 are designed to hold the animal securely in position in the pen, and for this purpose are formed in their opposing edges with corresponding cutaway portions or recesses $19^a$ and $20^a$ that are designed to accommodate the neck of the animal. The upper ends of the clamping members 19 and 20 work in the guideway between the horizontal strips 16 and 17 and are secured in the desired laterally adjusted position therein by any suitable means, although in the present instance for the purpose of illustration, they are shown as formed with openings extending therethrough and arranged for registry with openings formed in the strips 16 and 17 so as to permit the insertion of pins 27 or other similar fastening means. Secured to the standards 4 and 5 is a rest 22 which is horizontally disposed in close proximity to the recesses of the clamping members, so as to be susceptible of serving as a support for the nose of the confined animal. This rest is formed with transversely spaced openings $22^b$ extending therethrough, and a strap or rope or other suitable flexible member 23 passes loosely through these openings with its ends secured together so as to form loops on opposite sides of the rest, the uppermost loop constituting a noose arranged to encircle the nose of the animal to hold the same against the rest 22, and the lowermost loop being designed for engagement by the operator's foot, so that pressure may be conveniently applied to the upper noose to contract the same without the necessity of the operator employing one or both hands for this purpose. The nose rest is composed of a horizontally arranged member in which the spaced openings $22^b$ are formed, and which is provided at its forward edge, that is, the edge farther from the clamping members 19 and 20, with a vertically upwardly disposed guard that serves to limit the forward movement of the animal's head, when the same is positioned upon the rest, the guard being recessed, as indicated at $22^a$, so as not to interfere with the animal's breathing. In the present instance, two frame-like swinging members 24 and 25 are arranged longitudinally of the pen and are hingedly connected at their lower ends to the respective base members by means of bolts $24^a$ and $25^a$ or the like, said frame-like members being designed to be swung inwardly toward each other to limit the size of the interior of the pen according to the size of the animal to be confined therein, and the upper ends of said swinging members being secured in the desired adjusted position in any suitable manner, as by pins 26 passing therethrough and through apertures formed in the horizontal strips 16 and 17.

When it is desired to operate on the nose of a hog, the gate 15 is removed and the animal driven into the stanchion through the gate-way, and the gate 15 placed in position. When the animal is thus imprisoned, its nose will project through the opening formed by the cut-away portions $19^a$ and $20^a$, onto the member 22. As soon as the nose of the animal projects through the opening formed in members 19 and 20, these members are locked in position by means of pins 27, and the strap 23 is placed over the nose and pulled down by the foot. The swinging members 24 and 25 serve to limit the size of the stanchion.

What I claim and desire to secure by Letters Patent is:

1. In an animal stanchion, the combination of laterally adjustable vertical clamping members, a horizontal rest arranged transversely in front of the clamping members and consisting of a flat ledge adapted to support the head of an animal, the ledge being provided at its forward edge with an upturned flange for maintaining the head against forward displacement, and a flexible bond coöperating with the rest for holding the head down against the ledge.

2. In an animal stanchion, the combination of laterally adjustable vertical clamping members for embracing the neck of an animal, a horizontal rest disposed transversely in front of the clamping members and consisting of a flat ledge adapted to support the head of an animal, the ledge being provided at its forward edge with an upstanding flange for maintaining the head against forward displacement, the flange being formed with a recess to admit air to the animal's nostrils, and a flexible bond coöperating with the rest for holding the head down against the ledge.

3. In an animal stanchion, the combination of laterally adjustable vertical clamping members for embracing the neck of an animal, a horizontal rest disposed transversely in front of the clamping members and consisting of a flat ledge adapted to support the animal's head and formed with transversely spaced openings, the ledge being provided at its forward edge with an upstanding flange for holding the head against forward displacement, the flange being formed at a point intermediate of the spaced openings with a recess for admitting air to the animal's nostrils, and a flexible bond passed loosely through the spaced openings with its ends secured together to provide loops above and below the ledge, as and for the purpose specified.

In testimony whereof I affix my signature in presence of two witnesses.

WILLIAM C. GARNETT. [L. S.]

Witnesses:
G. A. HAMILTON,
JOHN SUMMERHAYS.